US012571980B2

(12) United States Patent
Linderman et al.

(10) Patent No.: US 12,571,980 B2
(45) Date of Patent: Mar. 10, 2026

(54) OPTICAL MODULE COMPONENT FEATURES THAT AID ADHESIVE ATTACHMENT

(71) Applicant: Apple Inc., Cupertino, CA (US)

(72) Inventors: Ryan J. Linderman, Oakland, CA (US); Michael K. McCord, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 1969 days.

(21) Appl. No.: 16/277,174

(22) Filed: Feb. 15, 2019

(65) Prior Publication Data

US 2020/0264401 A1     Aug. 20, 2020

(51) Int. Cl.
| | |
|---|---|
| *G02B 7/02* | (2021.01) |
| *B32B 3/30* | (2006.01) |
| *B32B 7/14* | (2006.01) |

(52) U.S. Cl.
CPC ................ *G02B 7/025* (2013.01); *B32B 3/30* (2013.01); *B32B 7/14* (2013.01); *B32B 2551/00* (2013.01)

(58) Field of Classification Search
CPC ......... H01L 33/52; H01L 33/54; G02B 7/025; Y10T 428/24479; B32B 3/30; B32B 7/14; B32B 2551/00
See application file for complete search history.

(56) References Cited

U.S. PATENT DOCUMENTS

| | | | |
|---|---|---|---|
| 6,640,032 B2 | 10/2003 | Kondo et al. | |
| 6,773,169 B2 | 8/2004 | Ebeling et al. | |
| 7,781,867 B2 | 8/2010 | Lee | |

FOREIGN PATENT DOCUMENTS

JP      2003329808 A  *  11/2003  ........... B29C 43/021

OTHER PUBLICATIONS

Translation of JP2003329808A. (Year: 2003).*
Qin et al., Low-Temperature Bonding for Silicon-Based Micro-Optical Systems, *Photonics*, 2015, vol. 2, pp. 1164-1201.

* cited by examiner

*Primary Examiner* — Catherine A. Simone
(74) *Attorney, Agent, or Firm* — Brownstein Hyatt Farber Schreck, LLP

(57) ABSTRACT

A cap for an optical module includes features that aid in adhesive attachment. In some examples, the cap includes a standoff configured to initiate capillary action upon contacting adhesive on a substrate to move the cap toward the substrate and an alignment feature configured to control lateral movement of the cap with respect to the substrate as the capillary action moves the cap toward the substrate. In other examples, the cap includes a standoff configured to initiate movement of an adhesive away from a substrate via surface tension and wetting upon contacting the adhesive and an alignment feature is configured to control lateral movement of the cap with respect to the substrate as the adhesive moves away from the substrate.

20 Claims, 13 Drawing Sheets

100

101

102

A

A

900

OPTICAL MODULE COMPONENT FEATURES THAT AID ADHESIVE ATTACHMENT

FIELD

The described embodiments relate generally to adhesively attaching components. More particularly, the present embodiments relate to components of optical modules which have features that aid attachment.

BACKGROUND

Many electronic devices use light sources. For example, many remote control devices use an infrared light-emitting diode (LED) to transmit instructions to another device, such as a television or a set top box. By way of another example, many mobile electronic devices (such as smart phones, tablet computing devices, laptop computing devices, and so on) use LEDs as a flash or other light source for a camera, in a proximity sensor, in a flood light emitter, and so on. Other electronic devices may use one or more light sources and/or light receivers to detect contact on and/or movement of objects across an optically transmissive component (such as a cover glass or other cover), concentrations and/or movement of objects in the air, and so on.

Light sources are often packaged in optical modules. The optical modules may include an enclosure formed by coupling a cap or other structure to a circuit board or other substrate, to encapsulate a light source. Lenses or other structures may be coupled to and/or integrated with the cap. In many examples, the cap may be attached to the substrate using adhesive.

SUMMARY

The present disclosure relates to components of optical modules which have features that aid attachment. A cap may be configured with a bonding area having one or more standoffs and/or alignment features. The standoffs may be configured to initiate capillary action upon contacting adhesive on a substrate. The capillary action may move at least a portion of the adhesive away from the substrate toward the cap via surface tension and wetting, moving the cap toward the substrate. The alignment features may control lateral movement of the cap with respect to the substrate as the adhesive moves towards the cap and the cap moves toward the substrate. Thus, the standoffs and/or alignment features may mitigate the above issues by controlling and/or maintaining alignment of the cap and substrate during optical module formation, directing adhesive, and/or removing excess adhesive. In this way, the features of the cap may improve the optical module formation process.

In some embodiments, a cap for an optical module includes a standoff and an alignment feature. The standoff is configured to initiate capillary action upon contacting adhesive on a substrate to move the cap toward the substrate. The alignment feature is configured to control lateral movement of the cap with respect to the substrate as the capillary action moves the cap toward the substrate.

In some examples, the alignment feature is a protrusion with a sloped edge. In various implementations of such examples, the sloped edge is operative to engage a side of the substrate adjacent to a surface on which the adhesive is positioned. In a number of implementations of such examples, the alignment feature includes a first protrusion and a second protrusion positioned at opposite sides of the cap.

In various examples, the cap includes a lens and the alignment feature aligns the lens with a light emitter on the substrate as the capillary action moves the cap toward the substrate. In some examples, the adhesive is a liquid. In a number of examples, the cap defines a reservoir and the capillary action pulls a portion of the adhesive into the reservoir.

In various embodiments, a cap for an optical module includes a standoff and an alignment feature. The standoff is configured to initiate movement of an adhesive away from a substrate via surface tension and wetting upon contacting the adhesive. The alignment feature is configured to control lateral movement of the cap with respect to the substrate as the adhesive moves away from the substrate.

In some examples, the adhesive is a first adhesive and the alignment feature is a protrusion that initiates capillary action upon contacting a second adhesive on the substrate. In various examples, the movement of the adhesive away from the substrate removes excess adhesive from the substrate. In a number of examples, the cap defines a vent. In various examples, the standoff includes at least two pairs of standoffs that are each disposed opposite each other. In a number of examples, the surface tension is operative to restrict movement of the cap. In various examples, the alignment feature includes at least two pairs of alignment features that are each disposed opposite each other.

In a number of embodiments, a cap for an optical module includes a bonding area and a capillary feature. The bonding area is configured to contact adhesive on a substrate when the cap is coupled to the substrate. The capillary feature is defined by the bonding area and is configured to direct flow of the adhesive. In various examples, the capillary feature is configured to direct the flow of the adhesive away from an electronic component on the substrate.

In some examples, the capillary feature is configured to direct the flow of the adhesive into a reservoir. In a number of implementations of such examples, the capillary feature is configured to block passage of light into the optical module or out of the optical module when filled with the adhesive. In various implementations of such examples, the cap defines the reservoir. In a number of implementations of such examples, the bonding area defines the reservoir. In some examples of such implementations, the substrate defines the reservoir.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
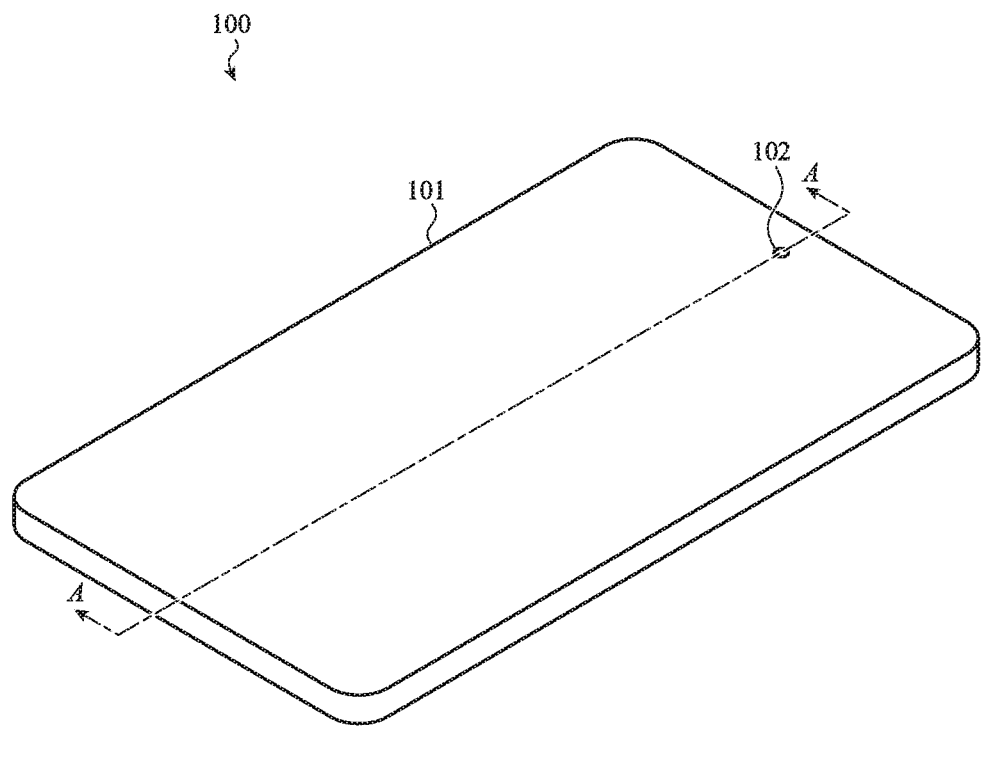
FIG. 1 depicts an example of an electronic device that includes an optical module that has a component with features that aid adhesive attachment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and apparatuses that embody various elements of the present disclosure. However, it should be understood that the described disclosure may be practiced in a variety of forms in addition to those described herein.

As part of forming assemblies like optical modules, caps or other structures may be placed on liquid adhesive or other adhesive positioned on printed circuit boards or other substrates. The liquid adhesive may then be allowed to cure, or may be actively cured, adhesively attaching the cap to the printed circuit board. In some examples, the placement of the cap and/or liquid adhesive may be performed by a pick-and-place machine and/or other mechanism of a surface mount technology component placement system.

The above may present a number of challenges, particularly when forming smaller and smaller optical modules. Placement of sufficient quantities of liquid adhesive in the appropriate locations may be difficult without resulting in excess liquid adhesive and/or liquid adhesive ending up in inappropriate locations. Liquid adhesive in inappropriate locations may damage and/or otherwise impair the operation of sensitive components. Further, excess liquid adhesive and/or presence of liquid adhesive in inappropriate locations may cause the cap to incorrectly align with the printed circuit board during optical module formation. For example, when surface tension forces are large relative to friction, viscosity, and weight of parts, liquid forces may tend to move the parts to a position of minimum surface energy in the liquid when released. In short, the cap may be small enough that the cap may float on the liquid adhesive and drift out of alignment with the printed circuit board if not held in place until the liquid adhesive cures. This may make optical module formation more complicated, error prone, time consuming, and expensive.

The following disclosure relates to components of optical modules which have features that aid attachment. A cap may be configured with a bonding area having one or more standoffs and/or alignment features. The standoffs may be configured to initiate capillary action upon contacting adhesive on a substrate. The capillary action may move at least a portion of the adhesive away from the substrate toward the cap via surface tension and wetting, moving the cap toward the substrate. The alignment features may control lateral movement of the cap with respect to the substrate as the adhesive moves towards the cap and the cap moves toward the substrate. Thus, the standoffs and/or alignment features may mitigate the above issues by controlling and/or maintaining alignment of the cap and substrate during optical module formation, directing adhesive, and/or removing excess adhesive. In this way, the features of the cap improve the optical module formation process.

In some examples, a standoff may be a projection positioned proud of a surface of a cap. The angling of surfaces and edges of such projections may be configured to control the capillary action caused when the projections contact adhesive. Similarly, the texture of the surfaces may be configured to control the capillary action caused when the projections contact adhesive.

In various examples, an alignment feature may include a protrusion with a sloped edge that is configured to contact a side of a substrate that is adjacent to a surface of the substrate on which an adhesive is positioned. This sloped edge may contact the side of the substrate to move a cap laterally as the cap moves toward the substrate. In other examples, an alignment feature may include a protrusion that initiates capillary action on an adhesive on a substrate to laterally move and/or restrict lateral movement of a cap with respect to the substrate.

In a number of examples, a cap and/or a substrate may define one or more other features that may aid attachment. These may include one or more reservoirs that direct the flow of adhesive, vents, fiducials that machine mechanisms may use to determine component orientation, and so on.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 depicts an example of an electronic device 100 that includes an optical module that has a component with features that aid adhesive attachment. In this example, the electronic device 100 may include a cover 101 (such as a cover glass and/or other cover or other lens or surface made of a material such as plastic, crystal, and so on) that defines an area 102 through which an optical module within the electronic device 100 may be able to transmit and/or receive light and/or other optical transmissions.

The electronic device 100 may be any kind of electronic device, such as a mobile telephone, a smart phone, a mobile computing device, a tablet computing device, a wearable device, a laptop computing device, a desktop computing device, a display, a digital media player, a kitchen appliance, and so on. The electronic device may include a number of different components not shown, such as one or more processing units, one or more input/output components (such as one or more keyboards, computer mice, touch screens, touch pads, force sensors, touch sensors, microphones, speakers, displays, pressure sensors, cameras, proximity sensors, light sensors, and so on), one or more communication units, one or more non-transitory storage media (which may take the form of, but is not limited to, a magnetic storage medium; optical storage medium; magneto-optical storage medium; read only memory; random access memory; erasable programmable memory; flash memory; and so on), and so on.

Figure 2:
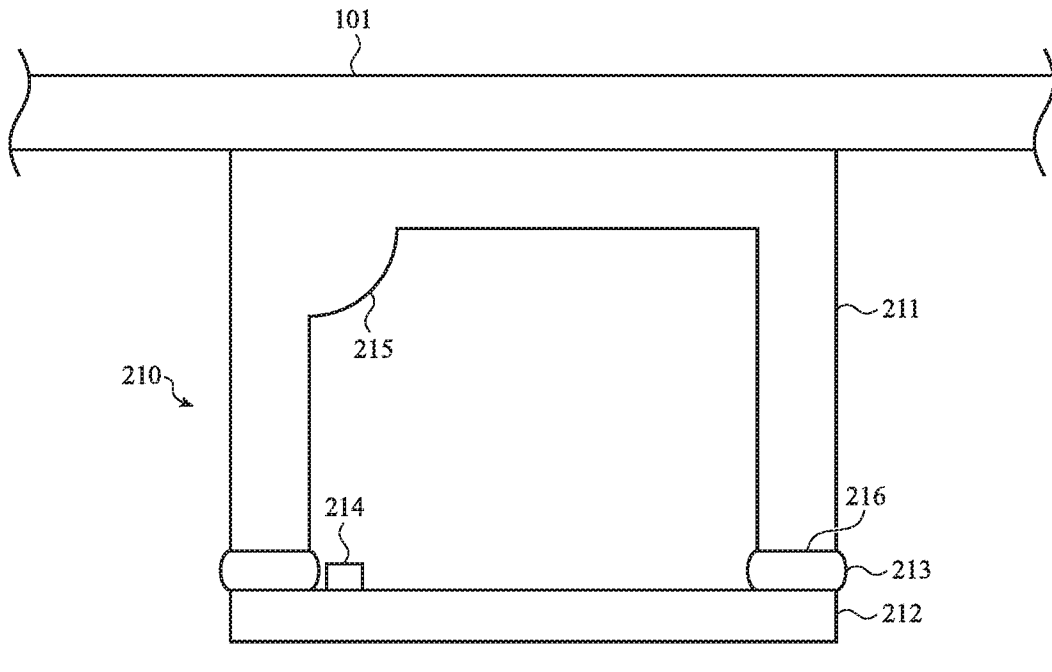
FIG. 2 depicts a partial cross section of the electronic device of FIG. 1, taken at a location along a line A-A of FIG. 1, showing an example of the optical module.

FIG. 2 depicts a partial cross section of the electronic device of FIG. 1, taken at a location along line A-A of FIG. 1, showing an example of the optical module 210. The optical module 210 may be positioned under the cover 101. The optical module 210 may include a cap 211 or other structure attached to a substrate (such as a printed circuit board, ceramic wafer, and so on) via adhesive 213. The cap 211 may be optically transmissive such that light or other optical signals transmitted by a light source 214 positioned on the substrate 212 may be operable to travel through the cap 211 and/or the cover 101.

In some examples, such light may travel through and/or be focused and/or otherwise modified by a lens 215 and/or other optical component defined by and/or coupled to the cap 211. Due to the functional relationship between the light source 214 and the lens 215, alignment of the cap 211 and the substrate 212 in the assembled optical module 210 may be particularly significant.

In some examples, the optical module 210 may be an infrared optical module operative to transmit instructions to a device, such as a television or a set top box. In other examples, the optical module 210 may function as a flash or other light source for a camera, a proximity sensor, a flood light emitter, and so on. In yet other examples, the optical module 210 may be operative to emit and receive light to detect contact on and/or movement of objects across the cover 101 (which may be an optically transmissive component), concentrations and/or movement of objects above the cover 101, and so on.

Figure 3A:
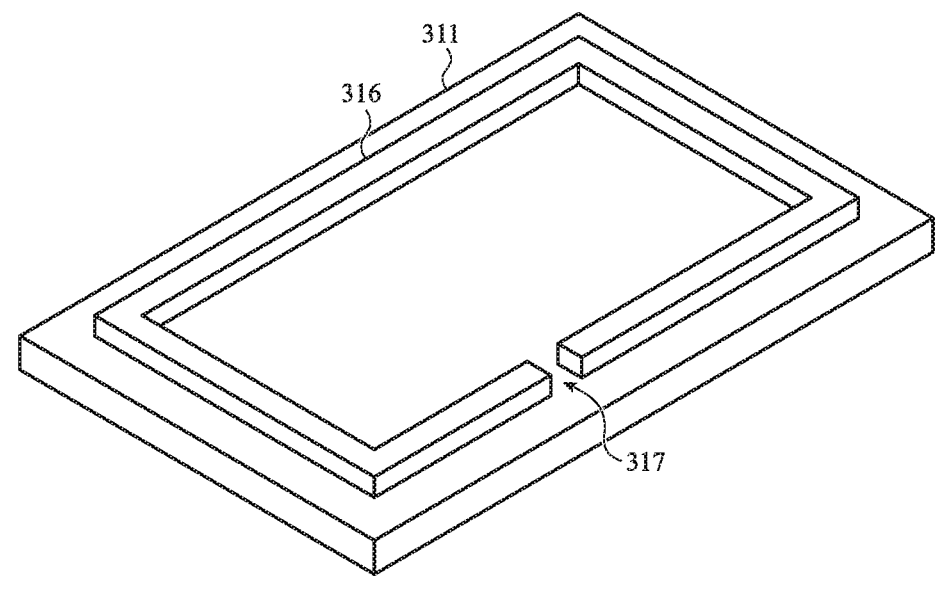
FIG. 3A depicts a first example of a cap that may be used in an optical module and includes features that aid adhesive attachment.

FIG. 3A depicts a first example of a cap 311 that may be used in an optical module and includes features that aid adhesive attachment. The cap 311 may include a standoff 316. In this example, the standoff 316 may be configured as a wall that forms the majority of a perimeter around a portion of the cap 311, interrupted by a gap 317 (or at least one gap). An optical module may be formed using the cap 311 by bringing the cap 311 into proximity with a substrate such that the standoff 316 contacts liquid adhesive or other adhesive on the substrate. The adhesive may flow into the gap 317, allowing the gap 317 to aid adhesive attachment by removing excess adhesive from the surface of the substrate and/or directing the adhesive away from sensitive components that may otherwise by impaired and/or damaged.

Figure 3B:
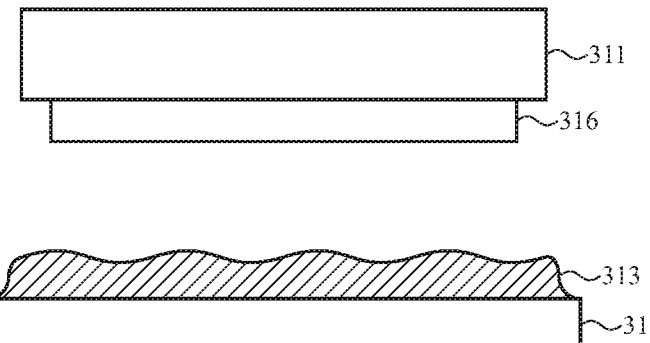
FIG. 3B depicts the cap of FIG. 3A positioned over a substrate.
Figure 3C:
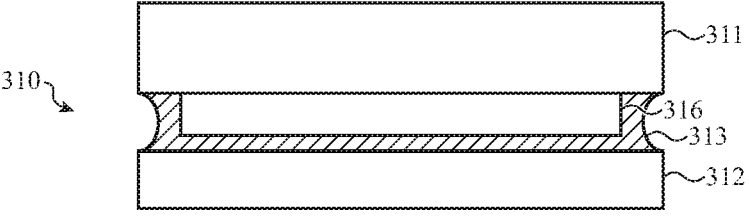
FIG. 3C depicts an optical module formed from the cap and substrate of FIG. 3B.

For example, FIG. 3B depicts the cap 311 of FIG. 3A positioned over a substrate 312. Adhesive 313, such as a liquid adhesive (such as a liquid epoxy), is positioned on the substrate 312. The cap 311 and the substrate 312 may be brought together such that the standoff 316 contacts the adhesive 313, as illustrated in FIG. 3C, forming the optical module 310.

Due to the relatively large wall arrangement of the standoff 316, the standoff 316 may not be particularly configured to initiate capillary action upon contacting the adhesive 313 to move the cap 311 toward the substrate 312 and/or move at least a portion of the adhesive 313 from the substrate 312 toward the cap 311. Further, the relatively large wall arrangement of the standoff 316 may correspond to the adhesive 313 being disposed on a relatively large area of the substrate 312. As a result of the adhesive 313 being disposed on such a relatively large area of the substrate 312, the standoff 316 may contact a surface of the adhesive 313 that is concave (with respect to the substrate 312) and/or flat or irregularly shaped. This may discourage capillary action that could move the cap 311 toward the substrate 312 and may even encourage a different capillary action that instead moves the cap 311 away from the substrate 312. The standoff 316 and the gap 317 may also not be sufficient to control and/or restrict lateral movement of the cap 311 with respect to the substrate 312 as the cap 311 moves toward the substrate 312 and/or the adhesive 313 cures.

Figures 4A, 4B:
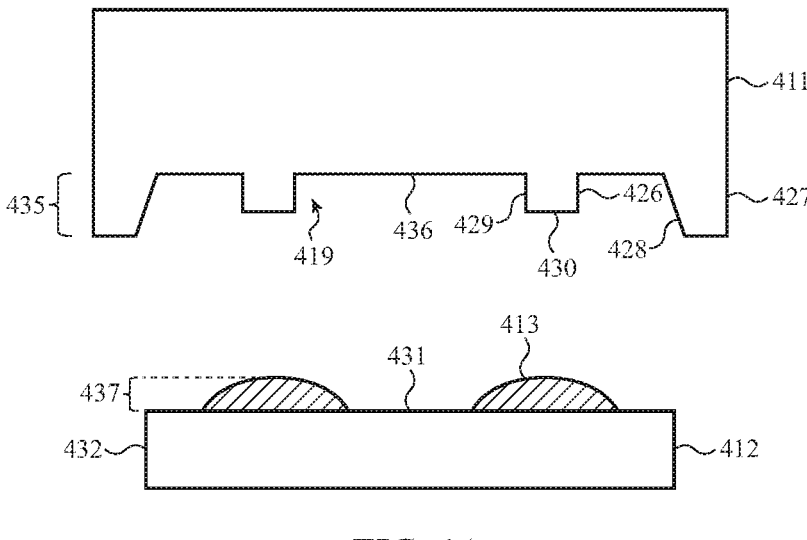
FIG. 4A depicts a second example of a cap, positioned over a substrate, that may be used in an optical module and includes features that aid adhesive attachment.
FIG. 4B depicts an optical module formed from the cap and substrate of FIG. 4A.

By way of contrast, FIG. 4A depicts a second example of a cap 411, positioned over a substrate 412, that may be used in an optical module and includes features that aid adhesive attachment. The cap 411 may include a bonding area 435 that includes a number of standoffs 426 and/or a number of alignment features 427.

The standoffs 426 may be configured with a number of aspects that initiate a capillary action when the standoffs 426 contact adhesive 413 (which may be a liquid adhesive, such as a liquid epoxy) positioned on a surface 431 of the substrate 412. This may be due to the interaction between surface tension of the adhesive 413 (or cohesion within the adhesive 413) and wetting (adhesive forces between the adhesive 413 and the standoffs 426). The combination of the surface tension and the wetting may wick the adhesive, moving at least a portion of the adhesive from the substrate 412 toward the cap 411 and moving the cap 411 toward substrate 412.

The standoffs 426 may be projections that are proud of a surface 436 of the cap 411. The standoffs 426 may be configured with adhesive contact surfaces 430 and sides 429. The angling of these sides 429 and the corners formed by the adhesive contact surfaces 430 and the sides 429 may contribute to initiating the capillary action. Thus, the standoffs 426 may function as capillary features.

For example, with reference to FIGS. 4A and 4B, a capillary may be formed by the standoff 426 contacting the adhesive 413. The capillary may have a total capillary volume defined by a capillary length 438 and a capillary gap 439. To trigger the capillary action, a thickness 437 of the adhesive may be at least as large as the capillary cap 439. This thickness 437 may thus define a minimum volume dispense specification for the adhesive 413. With additional adhesive 413, surface tension may draw the adhesive 413 further down the capillary length 438 because this minimizes the surface energy of the adhesive 413. The upper limit for maximum adhesive 413 dispense volume may be defined by the total capillary volume that may be filled, which may be estimated by the capillary length 438 times the capillary gap 439 times the capillary width (i.e., the dimension not shown that is perpendicular to the shown capillary length 438, which may typically be less than a thickness of walls that define the boundaries of the capillary width). Smaller capillaries and adhesive 413 (and/or other liquids) with higher surface tension may develop larger capillary force, which may pull the substrate 412 and cap 411 towards each other as the adhesive 413 fills more of the capillary length 438. These configuration aspects may encourage wetting of the adhesive 413 to the standoffs 426, moving at least a portion of the adhesive 413 from the substrate 412 toward the cap 411 into areas 419 defined between the sides 429 and the surface 436 and moving the cap 411 toward the substrate 412.

Additionally, the angle of the sides 429 is shown as 90 degrees with respect to the adhesive contact surfaces 430, or the sides 429 perpendicular to the adhesive contact surfaces 430, and the corners are shown as sharp corners, forming 90 degree angles between the adhesive contact surfaces 430 and the sides 429. This configuration may further encourage wetting whereas more sloped or curved sides 429 and/or more rounded corners between the adhesive contact surfaces 430 and the sides 429 may discourage and/or not encourage wetting. Further, the sides 429 and/or the adhesive contact surfaces 430 may be relatively smooth. Smoother textured surfaces may encourage wetting whereas rougher surfaces may discourage and/or not encourage wetting. Additionally, smaller capillaries defined by the smaller standoffs 426 as compared to the standoff 316 of FIGS. 3A-3C may create stronger capillary forces. However, this may involve finer control of adhesive 413 dispensing, which may become increasingly challenging for adhesive 413 dispensing tools. If too much adhesive 413 is dispensed, the capillary may completely fill and the liquid forces may lift the cap 411 similar to that shown in FIG. 3C.

The alignment features 427 may control lateral movement of the cap 411 with respect to the substrate 412. The alignment features 427 may include protrusions with sloped edges 428 that are configured to contact sides 432 of the substrate 412 that are adjacent to the surface 431 and/or corners or edges between the sides 432 and the surface 431. These sloped edges 428 may contact the sides 432 of the substrate 412 to move the cap 411 laterally as the cap 411 moves toward the substrate 412. For example, if the sloped edge 428 at one side of the cap 411 contacts the corresponding side 432 but the other sloped edge 428 does not, the slope may force the cap 411 laterally in a direction to bring the non-contacting sloped edge 428 into contact and relieve interference between the contacting sloped edge 428 and the respective side 432.

FIG. 4B shows the optical module 410 formed by the above. As shown, the capillary action wicked the adhesive 413 from the surface 431 of the substrate 412 around the standoffs 426 and onto the surface 436 of the cap 411. As also shown, the sloped edges 428 of the alignment features 427 contacted the sides 432 of the substrate 412, controlling the lateral movement of the cap 411 with respect to the substrate 412 so that the substrate 412 and the cap 411 are aligned.

Figure 5:
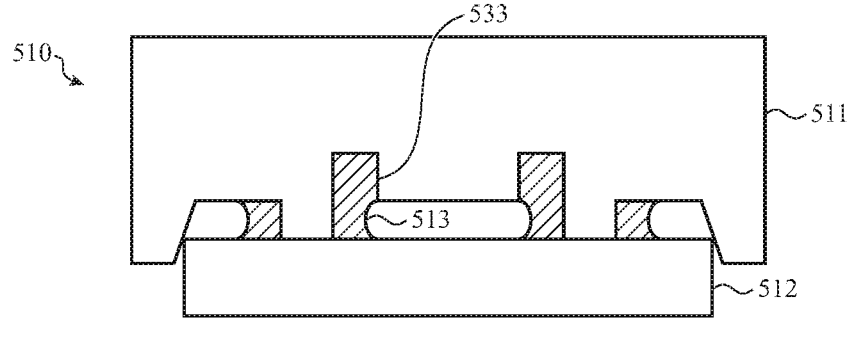
FIG. 5 depicts an alternative embodiment of the optical module of FIG. 4B including a third example of a cap.

FIG. 5 depicts an alternative optical module 510 embodiment of the optical module 410 of FIG. 4B including a third example of a cap 511. In this example, the cap 511 includes reservoirs 533. The capillary action is operative to draw the adhesive 513 into the reservoirs 533 when the cap 511 and substrate 512 are brought together. Thus, the reservoirs 533 are operative to remove and mitigate excess adhesive 513, preventing the excess adhesive 513 from damaging and/or impairing sensitive components and/or interfering with alignment and/or attachment of the cap 511 and substrate 512.

Although the alignment features 427 of FIG. 4A are illustrated and described as protrusions with sloped edges 428, other alignment feature configurations are possible and contemplated without departing from the scope of the present disclosure. For example, FIG. 6A depicts a fourth example of a cap 611, positioned over a substrate 612, that may be used in an optical module and includes features that aid adhesive attachment.

As contrasted with the embodiment of FIGS. 4A-4B, the cap 611 has a bonding area 635 with standoffs 626 and alignment features 627 that have non-sloped edges 628. The edges 628 may enable the alignment features 627 to engage a capillary action on adhesive 613 positioned at corners of the substrate 612 upon contact when the cap 611 and substrate 612 are brought together. Thus, both the standoffs 626 and the alignment features 627 may separately function as capillary features.

Figure 6A:
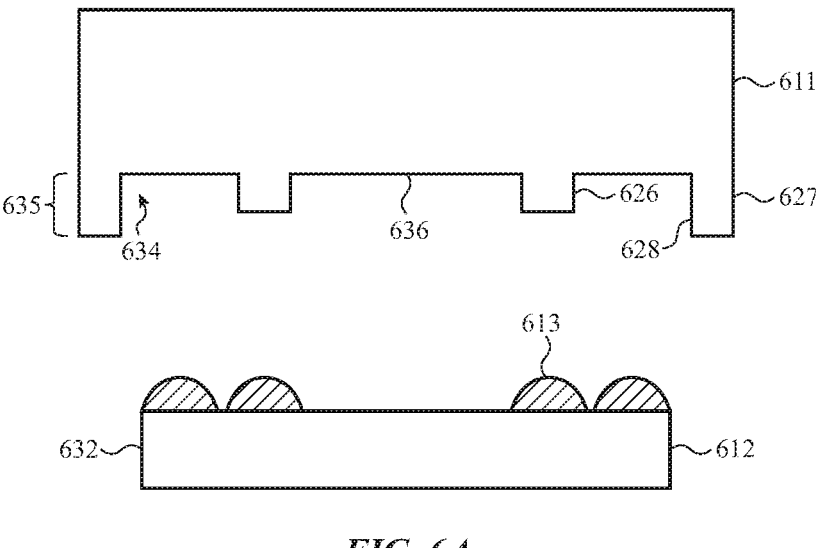
FIG. 6A depicts a fourth example of a cap, positioned over a substrate, that may be used in an optical module and includes features that aid adhesive attachment.
Figure 6B:
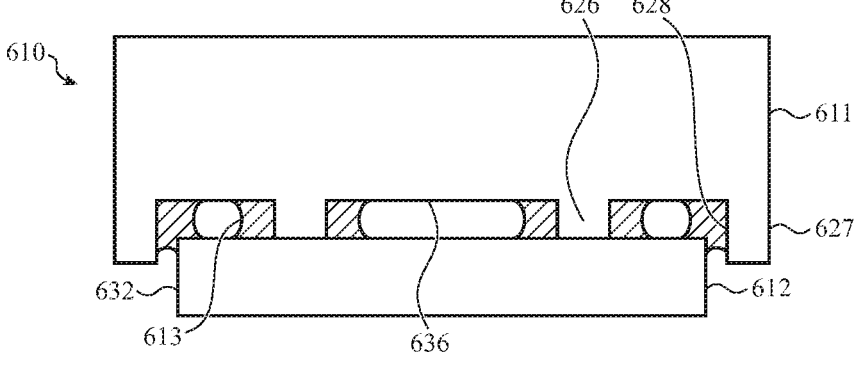
FIG. 6B depicts an optical module formed from the cap and substrate of FIG. 6A.

As shown in FIG. 6B, the capillary action moves the adhesive 613 into areas 634 defined between the edges 628 and a surface 636 of the cap 611 on opposing sides of the cap 611, exerting force laterally on the cap 611 with respect to the substrate 612. This may laterally move and/or restrict lateral movement of the cap 611 with respect to the substrate 612 similarly to the function achieved by the sloped edges 428 of the alignment features 427 of FIG. 4A.

Figure 6C:
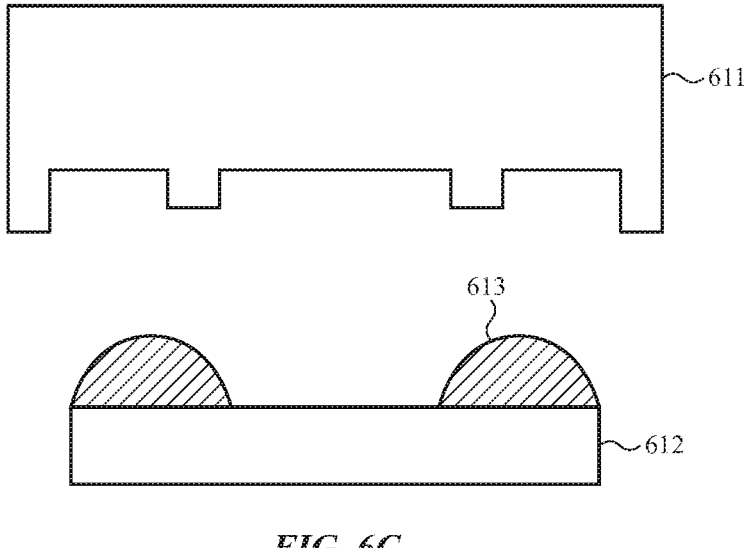
FIG. 6C depicts an alternative example of FIG. 6A illustrating a different adhesive dispense pattern.
Figure 6D:
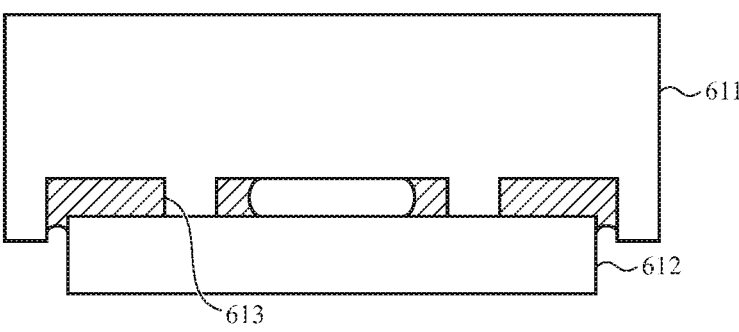
FIG. 6D depicts an optical module formed from the alternative example shown in FIG. 6C.

Although FIGS. 6A-6B illustrate separately dispensed adhesive 613 to engage the standoffs 626 and the alignment features 627, it is understood that this is an example. Other dispense patterns are possible and contemplated without departing from the scope of the present disclosure. For example, FIG. 6C depicts an alternative example where a single larger dispensed area of adhesive may engage both a standoff and an alignment feature when the cap 611 and substrate 612 are brought together, as shown in FIG. 6D.

Figure 7A:
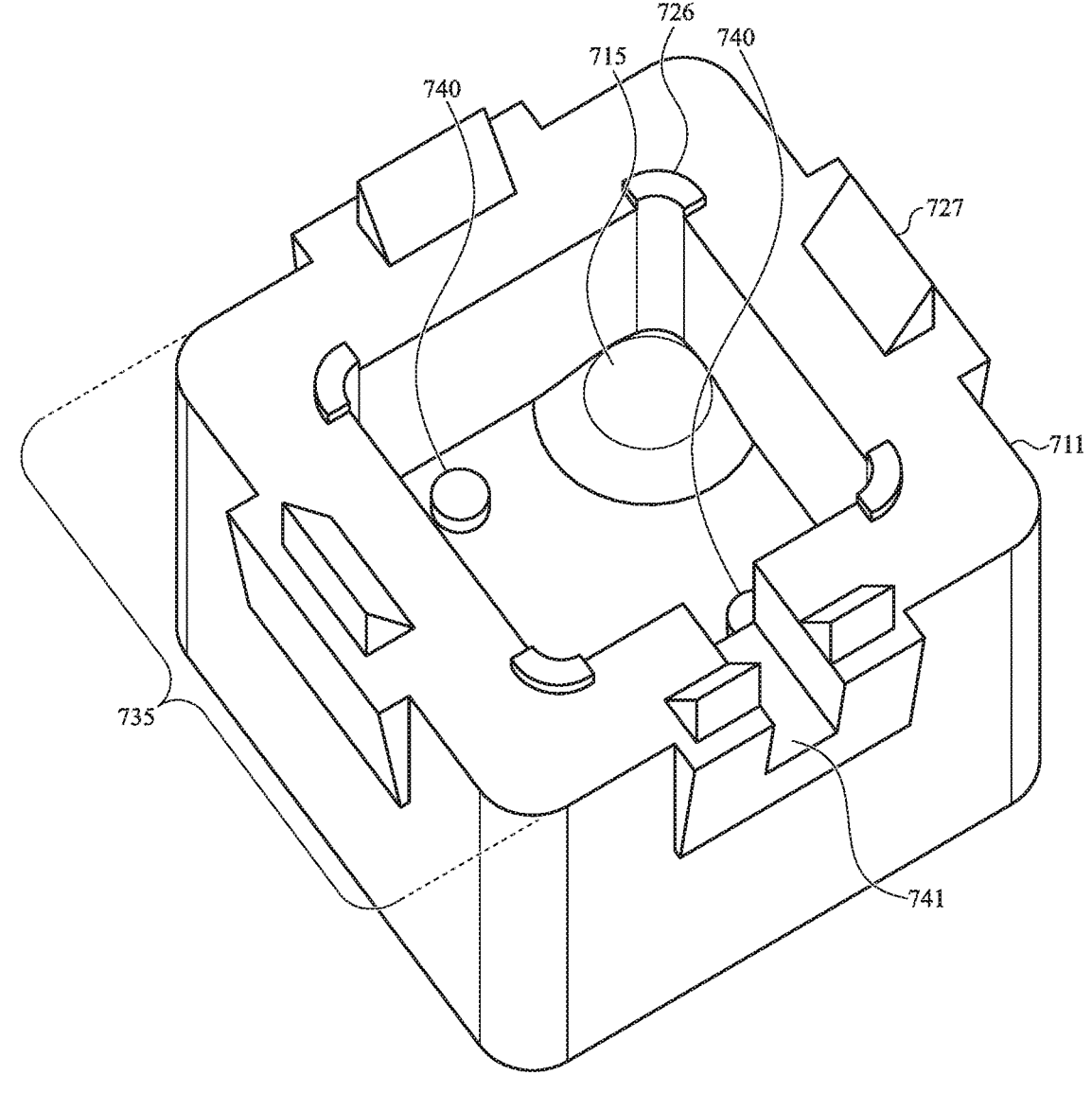
FIG. 7A depicts a fifth example of a cap that may be used in an optical module and includes features that aid adhesive attachment.

FIG. 7A depicts a fifth example of a cap 711 that may be used in an optical module and includes features that aid adhesive attachment. As shown, the cap 711 includes a bonding area 735, standoffs 726 positioned at opposing corners of a cavity defined by the cap 711, and a number of alignment features 727 positioned at opposing sides of the cavity. The cap 711 may include a number of other features, such as a lens 715 defined by the cap 711, a vent 741 defined by the cap that is operative to vent the cavity after the cap 711 is included in an optical assembly (and/or as a reservoir to draw off excess adhesive), and a number of fiducials 740 that machine mechanisms (such as a camera-controlled movement mechanism that may visually recognize the fiducials) may use to determine cap 711 orientation, and so on.

Figure 7B:
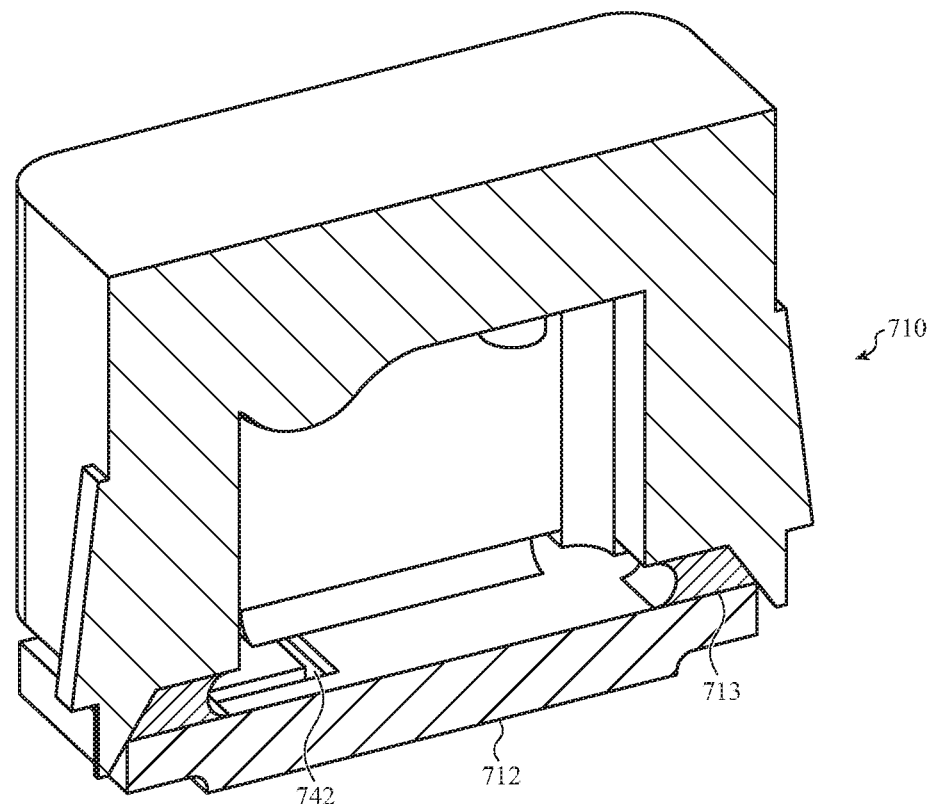
FIG. 7B depicts an optical module formed from the cap of FIG. 7A.

FIG. 7B depicts an optical module 710 formed from the cap 711 of FIG. 7A. As shown, the cap 711 is adhesively attached to a substrate 712 via adhesive 713. With regards to FIGS. 7A-7B, the standoffs 726 may have initiated a capillary action when the standoffs 726 contacted the adhesive 713 on the substrate 712, moving the adhesive 713 toward the cap 711 and moving the cap 711 toward the substrate 712. During such movement, the alignment features 727 may have contacted sides of the substrate 712 to control lateral movement of the cap 711 with respect to the substrate 712.

Additionally, FIG. 7B illustrates a reservoir 742 defined in the substrate 712. This reservoir 742 may be connected to areas where the adhesive 713 is applied such that the reservoir 742 may function to draw off excessive adhesive 713.

In some implementations, a cap for an optical module may include a standoff and an alignment feature. The standoff may be configured to initiate capillary action upon contacting adhesive on a substrate to move the cap toward the substrate. The alignment feature may be configured to control lateral movement of the cap with respect to the substrate as the capillary action moves the cap toward the substrate.

In some examples, the alignment feature may be a protrusion with a sloped edge. In various such examples, the sloped edge may be operative to engage a side of the substrate adjacent to a surface on which the adhesive is positioned. In a number of such examples, the alignment feature may include a first protrusion and a second protrusion positioned at opposite sides of the cap.

In various examples, the cap may include a lens and the alignment feature may align the lens with a light emitter on the substrate as the capillary action moves the cap toward the substrate. In some examples, the adhesive may be a liquid. In a number of examples, the cap may define a reservoir and the capillary action may pull a portion of the adhesive into the reservoir.

In various implementations, a cap for an optical module may include a standoff and an alignment feature. The standoff may be configured to initiate movement of an adhesive away from a substrate via surface tension and wetting upon contacting the adhesive. The alignment feature may be configured to control lateral movement of the cap with respect to the substrate as the adhesive moves away from the substrate.

In some examples, the adhesive may be a first adhesive and the alignment feature may be a protrusion that initiates capillary action upon contacting a second adhesive on the substrate. In various examples, the movement of the adhesive away from the substrate may remove excess adhesive from the substrate. In a number of examples, the cap may define a vent. In various examples, the standoff may include at least two pairs of standoffs that are each disposed opposite each other. In a number of examples, the surface tension may be operative to restrict movement of the cap. In various examples, the alignment feature may include at least two pairs of alignment features that are each disposed opposite each other.

Figure 8A:
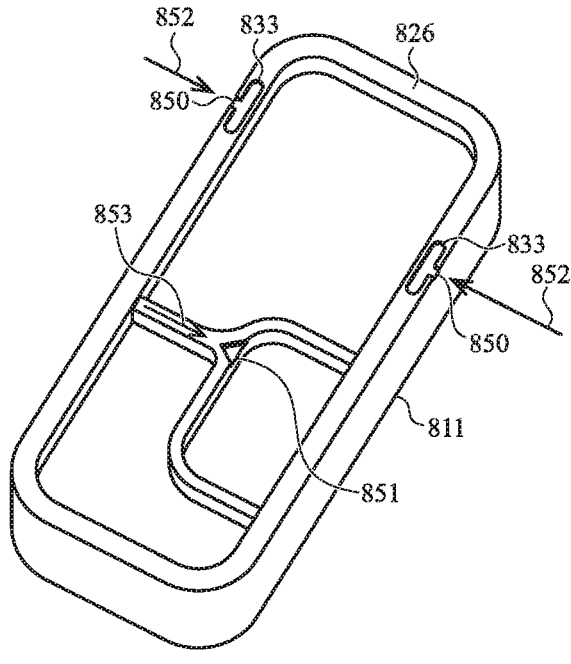
FIG. 8A depicts a sixth example of a cap that may be used in an optical module and includes features that aid adhesive attachment.
Figure 8B:
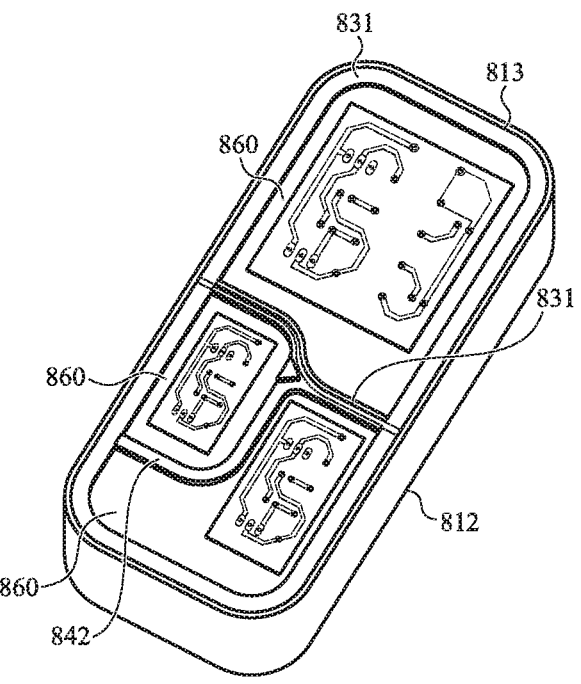
FIG. 8B depicts an example of a substrate that may be coupled to the cap of FIG. 8A to form an optical module.

FIG. 8A depicts a sixth example of a cap 811 that may be used in an optical module and includes features that aid adhesive attachment. The cap 811 may include a bonding area 826. With regards to FIGS. 8A and 8B, the bonding area 826 may be configured to contact adhesive 813 on a substrate bonding area 831 of a substrate 812. The bonding area 826 may define capillary features 850 and 851.

The capillary features 850 may be connected to reservoirs 833 defined in the bonding area 826. When the bonding area 826 contacts the adhesive 813 on the substrate bonding area 831 of the substrate 812, the capillary features 850 may be respectively configured to initiate capillary actions that respectively direct the flow of the adhesive 813 in directions 852 into the reservoirs 833. This may remove excess adhesive 813 and direct the flow of the adhesive 813 away from sensitive components in one or more areas 860 of the substrate 812, preventing damage of and/or impairment to the sensitive components.

When the bonding area 826 is brought into contact with the substrate bonding area 831 of the substrate 812, the capillary feature 851 may be connected to a reservoir 842 defined by the substrate 812. The capillary feature 851 may be configured to initiate a capillary action that directs the flow of the adhesive 813 in a direction 853 into the reservoir 842. This may remove excess adhesive 813 and direct the flow of the adhesive 813 away from sensitive components in one or more areas 860 of the substrate 812, preventing damage of and/or impairment to the sensitive components.

In this example, the cap 811 is shown without standoffs or alignment features. However, it is understood that this is an example. In various implementations, one or more standoffs and/or alignment features may be included and/or substituted for the capillary features 850 and/or 851 without departing from the scope of the present disclosure.

In a number of implementations, a cap for an optical module may include a bonding area and a capillary feature. The bonding area may be configured to contact adhesive on a substrate when the cap is coupled to the substrate. The capillary feature may be defined by the bonding area and may be configured to direct flow of the adhesive. In various examples, the capillary feature may be configured to direct the flow of the adhesive away from an electronic component on the substrate.

In some examples, the capillary feature may be configured to direct the flow of the adhesive into a reservoir. In a number of such examples, the capillary feature is configured to block passage of light into the optical module or out of the optical module when filled with the adhesive. In several of such examples, the cap may define the reservoir. In a number of such examples, the bonding area may define the reservoir. In some such implementations, the substrate may define the reservoir.

Figure 8C:
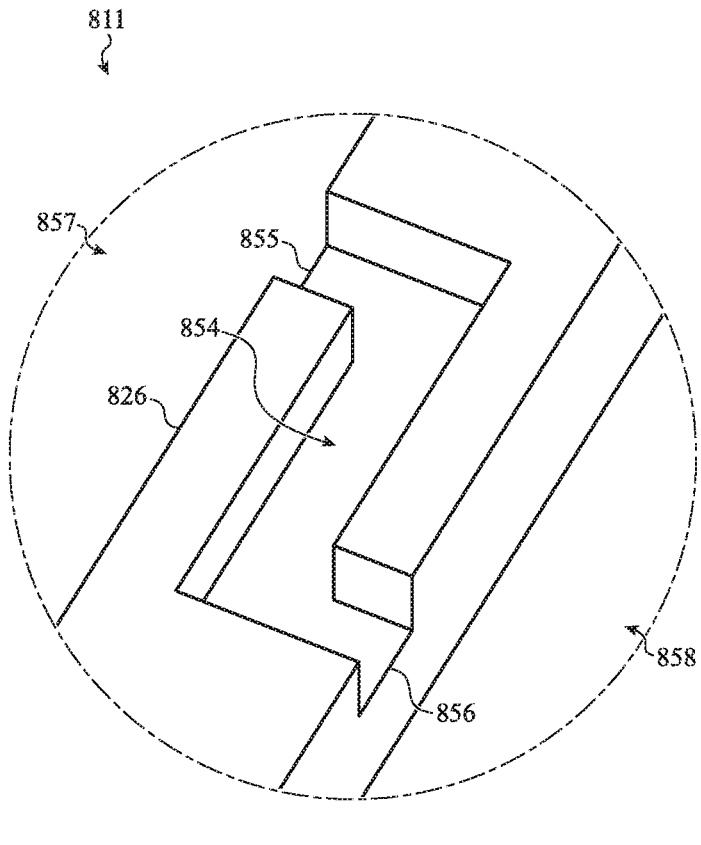
FIG. 8C depicts an alternative example of a reservoir that may be used in a cap, such as the cap of FIG. 8A.

Although FIG. 8A depicts an example of a reservoir 833, it is understood that this is an example and that other reservoirs may be used without departing from the scope of the present disclosure. For example, FIG. 8C depicts an alternative example of a reservoir 854 that may be used in a cap 811, such as the cap 811 of FIG. 8A.

In this example, the reservoir 854 may be configured in a bonding area 826 that may be configured to be brought into contact with adhesive. The reservoir may have a first port 855 that connects the reservoir 854 to an internal area 857 within the cap and a second port 856 that connects the reservoir 854 with an external area 858 outside the cap.

The configuration of this reservoir 854 may allow air bubbles in adhesive that enters the reservoir 854 to exit to either the internal area 857 and/or the external area 858, which may prevent blockage of adhesive flow due to such air bubbles. Further, the first port 855 and the second port 856 are offset. As such, the reservoir 854 may not form a direct optical path for light into and/or out of the cap 811. In other words, the reservoir 854 (which may also be a capillary feature in some examples) may be configured to block passage of light into an optical module formed using the cap 811 and/or out of such an optical module when filled with adhesive. This may prevent light interference that might otherwise occur due to an aperture in the cap 811 with a direct optical path.

Figure 9:
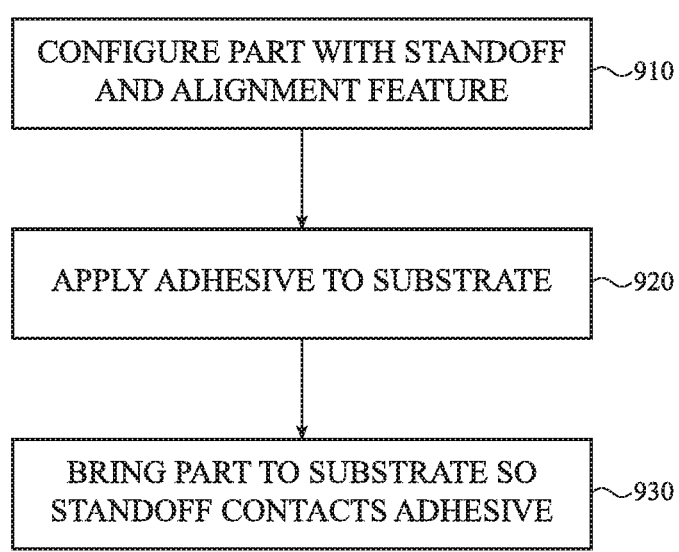
FIG. 9 depicts a flow chart illustrating a method for forming an assembly that includes a component having features that aid adhesive attachment. This method may form one or more of the optical modules illustrated in FIGS. 2, 3C, 4B, 5, 6B, and/or 7B.

FIG. 9 depicts a flow chart illustrating a method 900 for forming an assembly that includes a component having features that aid adhesive attachment. This method may form one or more of the optical modules illustrated in FIGS. 2, 3C, 4B, 5, 6B, and/or 7B.

At 910, a part may be configured with a standoff and an alignment feature. In some examples, the part may be a cap for an optical module. In various examples, the standoff and/or the alignment feature may be a capillary feature. In a number of examples, the alignment feature may be a protrusion that includes a sloped edge. In other examples, the alignment feature may include a protrusion that is configured to initiate a capillary action.

In a number of examples, the part may also be configured with a reservoir feature. The reservoir feature may function differently than the capillary feature. Whereas the capillary feature may leverage surface tension to pull components (such as the part and a substrate) together, the reservoir may be configured to prevent adhesive and/or other material from flowing onto sensitive areas, absorb excess adhesive and/or other material, and so on.

At 920, adhesive may be applied to a substrate. The substrate may be a printed circuit board, ceramic wafer, and so on. The adhesive may be a liquid adhesive, such as a liquid epoxy.

At 930, the part may be brought to the substrate so the standoff contacts the adhesive. The standoff may initiate a capillary action that moves the part towards the substrate and directs at least a portion of the adhesive from the substrate to the part. The alignment feature may control and/or restrict lateral movement of the part with respect to the substrate during the movement of the part and/or the portion of the adhesive.

Although the example method 900 is illustrated and described as including particular operations performed in a particular order, it is understood that this is an example. In various implementations, various orders of the same, similar, and/or different operations may be performed without departing from the scope of the present disclosure.

For example, 910 is illustrated and described as configuring the part with a standoff and an alignment feature. However, in various examples, the part may be configured with one or more of the standoff and the alignment feature but not both. In other examples, the substrate may be configured with one or more of the standoff and/or the alignment feature and/or the adhesive may be applied to the part instead of and/or in addition to the substrate. Various configurations are possible and contemplated without departing from the scope of the present disclosure.

As described above and illustrated in the accompanying figures, the present disclosure relates to components of optical modules which have features that aid attachment. A cap may be configured with a bonding area having one or more standoffs and/or alignment features. The standoffs may be configured to initiate capillary action upon contacting adhesive on a substrate. The capillary action may move at least a portion of the adhesive away from the substrate toward the cap via surface tension and wetting, moving the cap toward the substrate. The alignment features may control lateral movement of the cap with respect to the substrate as the adhesive moves towards the cap and the cap moves toward the substrate. Thus, the standoffs and/or alignment features may mitigate the above issues by controlling and/or maintaining alignment of the cap and substrate during optical module formation, directing adhesive, and/or removing excess adhesive. In this way, the features of the cap improve the optical module formation process.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may utilize a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A cap for an optical module, comprising:
a standoff that initiates capillary action upon contacting adhesive on a substrate that moves the cap toward the substrate; and
an alignment feature that controls lateral movement of the cap with respect to the substrate as the capillary action moves the cap toward the substrate.

2. The cap of claim 1, wherein the alignment feature comprises a protrusion with a sloped edge.

3. The cap of claim 2, wherein the sloped edge is operative to engage a side of the substrate adjacent to a surface on which the adhesive is positioned.

4. The cap of claim 2, wherein the alignment feature comprises a first protrusion and a second protrusion positioned at opposite sides of the cap.

5. The cap of claim 1, wherein:
the cap includes a lens; and
the alignment feature aligns the lens with a light emitter on the substrate as the capillary action moves the cap toward the substrate.

6. The cap of claim 1, wherein the adhesive is a liquid.

7. The cap of claim 1, wherein:
the cap defines a reservoir; and
the capillary action pulls a portion of the adhesive into the reservoir.

8. A cap for an optical module, comprising:
a standoff that initiates movement of an adhesive away from a substrate via surface tension and wetting upon contacting the adhesive; and
an alignment feature that controls lateral movement of the cap with respect to the substrate as the adhesive moves away from the substrate.

9. The cap of claim 8, wherein:
the adhesive is a first adhesive; and
the alignment feature comprises a protrusion that initiates capillary action upon contacting a second adhesive on the substrate.

10. The cap of claim 8, wherein the movement of the adhesive away from the substrate removes excess adhesive from the substrate.

11. The cap of claim 8, wherein the cap defines a vent.

12. The cap of claim 8, wherein the standoff comprises at least two pairs of standoffs that are each disposed opposite each other.

13. The cap of claim 8, wherein the surface tension is operative to restrict movement of the cap.

14. The cap of claim 8, wherein the alignment feature comprises at least two pairs of alignment features that are each disposed opposite each other.

15. A cap for an optical module, comprising:

a bonding area that contacts adhesive on a substrate when the cap is coupled to the substrate; and a capillary feature defined by the bonding area and that directs flow of the adhesive; wherein:

the capillary feature blocks passage of light into the optical module or out of the optical module when filled with the adhesive.

16. The cap of claim 15, wherein the capillary feature directs the flow of the adhesive into a reservoir.

17. The cap of claim 16, wherein the cap defines the reservoir.

18. The cap of claim 16, wherein the bonding area defines the reservoir.

19. The cap of claim 16, wherein the substrate defines the reservoir.

20. A cap for an optical module, comprising:

a bonding area that contacts adhesive on a substrate when the cap is coupled to the substrate; and a capillary feature defined by the bonding area and that directs flow of the adhesive: wherein;

the capillary feature directs the flow of the adhesive away from an electronic component on the substrate.

* * * * *